(12) United States Patent
Chen

(10) Patent No.: US 8,693,174 B2
(45) Date of Patent: Apr. 8, 2014

(54) TOUCH DISPLAY ASSEMBLY STRUCTURE

(75) Inventor: Kuo-Cheng Chen, Taipei (TW)

(73) Assignee: Inventec Corporation, Taipei (TW)

( * ) Notice: Subject to any disclaimer, the term of this patent is extended or adjusted under 35 U.S.C. 154(b) by 647 days.

(21) Appl. No.: 13/031,261

(22) Filed: Feb. 21, 2011

(65) Prior Publication Data

US 2012/0133608 A1 May 31, 2012

(30) Foreign Application Priority Data

Nov. 29, 2010 (CN) .......................... 2010 1 0572283

(51) Int. Cl.
*H05K 5/00* (2006.01)

(52) U.S. Cl.
USPC ...... 361/679.01; 345/168; 345/169; 345/173; 361/679.02

(58) Field of Classification Search
USPC ............. 361/679.01, 679.02, 679.09, 679.21, 361/679.26, 679.3, 679.56; 345/168, 169, 345/173
See application file for complete search history.

(56) References Cited

U.S. PATENT DOCUMENTS

| | | | |
|---|---|---|---|
| 7,116,386 B2 * | 10/2006 | Lee et al. | 349/58 |
| 2008/0303797 A1 * | 12/2008 | Grothe | 345/173 |
| 2010/0182135 A1 * | 7/2010 | Moosavi | 340/407.2 |

FOREIGN PATENT DOCUMENTS

| | | |
|---|---|---|
| TW | M313819 | 6/2007 |
| TW | M324212 | 12/2007 |
| TW | M328742 | 3/2008 |

* cited by examiner

Primary Examiner — Robert J Hoffberg
Assistant Examiner — Hung Dang
(74) Attorney, Agent, or Firm — CKC & Partners Co., Ltd.

(57) ABSTRACT

A touch display assembly structure is disclosed, which includes a capacitor type touch panel, a display panel, a plastic side frame, and an adhesive layer. The plastic side frame includes a side frame edge and a support piece disposed inner the side frame edge. The support piece is disposed between the touch panel and the display panel. The support piece has an opening to expose a display area of the display panel. The adhesive layer bonds the capacitor type touch panel and the support piece. There is an air layer disposed between the touch panel and the display panel. The material of the support piece includes polyphenylene sulfide. The thickness of the support piece is less than 0.4 mm.

10 Claims, 2 Drawing Sheets

TOUCH DISPLAY ASSEMBLY STRUCTURE

RELATED APPLICATIONS

This application claims priority to China Application Serial Number 201010572283.9, filed Nov. 29, 2010, which is herein incorporated by reference.

BACKGROUND

1. Field of Invention

The present invention relates to a touch display, and more particularly to a touch display assembly structure.

2. Description of Related Art

Along with the development of the 3C (Computer, Communications and Consumer) industry, more and more people use a mobile device as an assistance tool in their life. For example, the common mobile devices are personal digital assistants (PDAs), mobile phones, smart phones and so on, and these mobile devices are small in size and easy to carry, so the number of people using a mobile device becomes larger and larger, and more functions the users need are required accordingly.

A touch function is already widely applied in the field of the smart phone. However, the smart phone is still required to be light and thin. Elements of the smart phone themselves still need to meet some specifications. For example, the interval between a capacitor type touch panel and a display panel needs to be maintained to be 0.4-0.6 mm and no metal component should exist therebetween. The thickness of the interval is approximately equal to the thickness of a backing adhesive, and in most of the existing assembly manners, the capacitor type touch panel and the display panel are bonded through a backing adhesive. However, these assembly manners not only need accurate alignment, but also have a high possibility to damage the capacitor type touch panel or the display panel during rework.

Therefore, it is a need to maintain the lightness and thinness characteristics of the smart phone and also provide the smart phone with the touch function.

SUMMARY

In view of the above, the present invention provides a touch display assembly structure for assembling a touch panel and a display panel.

According to an embodiment of the present invention, a touch display assembly structure is provided, which includes a capacitor type touch panel, a display panel, a plastic side frame and an adhesive layer. The display panel has a display area. The plastic side frame includes a side frame edge and a support piece disposed inside the side frame edge. The support piece is disposed between the capacitor type touch panel and the display panel, and the support piece has an opening to expose the display area. The adhesive layer bonds the capacitor type touch panel and the support piece. There is an air layer disposed between the capacitor type touch panel and the display area. The material of the support piece includes polyphenylene sulfide. The thickness of the support piece is less than 0.4 mm.

The touch display assembly structure further includes a middle frame, wherein the middle frame is combined with the plastic side frame, and the display panel is fixed on the middle frame. The touch display assembly structure further includes a buffering material disposed between the support piece and the display panel. A material of the side frame edge can be polystyrene or Acrylonitrile-Butadene-Styrene (ABS).

The plastic side frame is manufactured through a process of coinjection molding, so that the thickness of the support piece can be controlled to be about 0.2 mm. The touch panel can be bonded on the support piece but does not need to be completely bonded with the display panel surface by surface, thereby reducing damages to the touch panel and the display panel during rework.

It is to be understood that both the foregoing general description and the following detailed description are by examples, and are intended to provide further explanation of the invention as claimed.

BRIEF DESCRIPTION OF THE DRAWINGS

In order to make the foregoing as well as other aspects, features, advantages, and embodiments of the present invention more apparent, the accompanying drawings are described as follows.

DETAILED DESCRIPTION

The spirit of the present invention will be clearly described with reference to the accompanying drawings and the detailed embodiments below. From the techniques taught in the present invention, any people of ordinary skills in the art can make various modifications and variations without departing from the spirit or scope of the present invention after understanding preferred embodiments of the present invention.

Figure 1:
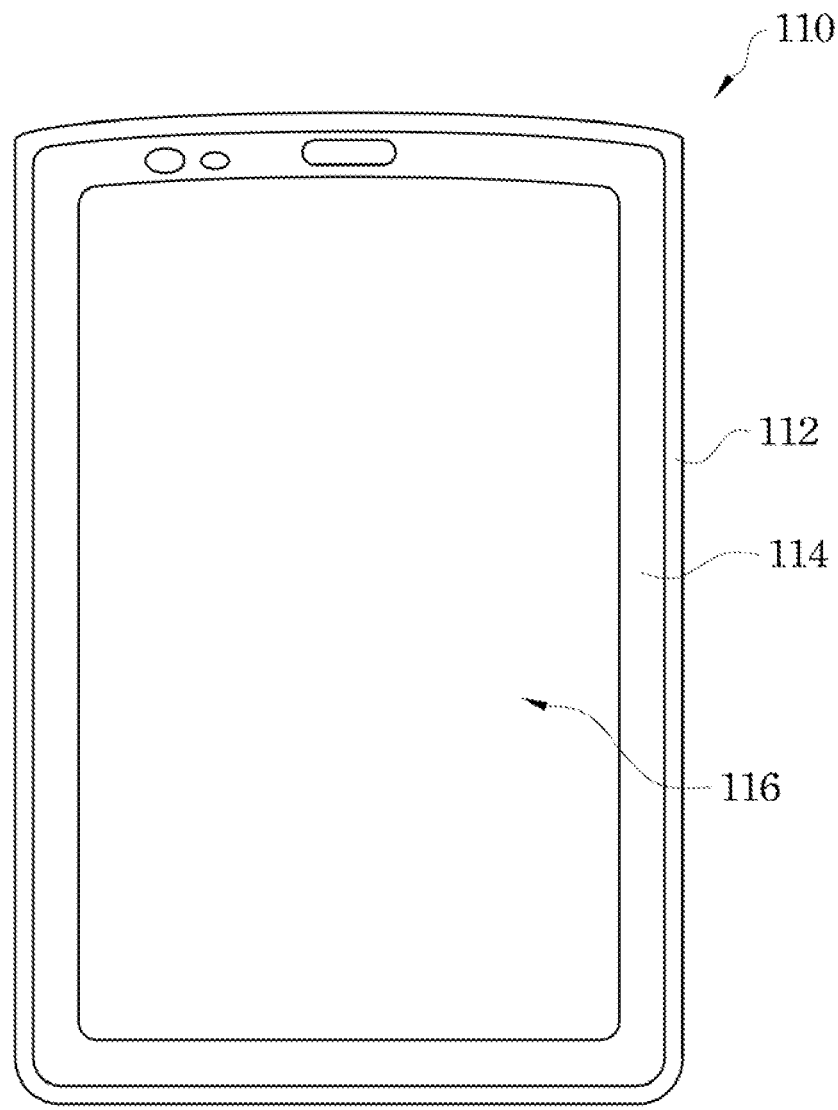
FIG. 1 is a schematic diagram of an embodiment of a touch display assembly structure according to the present invention.

FIG. 1 is a schematic diagram of an embodiment of a touch display assembly structure according to the present invention. A plastic side frame 110 applied in the touch display assembly structure is shown in the figure. The plastic side frame 110 includes a side frame edge 112 and a support piece 114 disposed inside the side frame edge 112. The side frame edge 112 is used as an apparent display surface. The side frame edge 112 and the support piece 114 are formed and joined together by a coinjection molding process. The material of the support piece 114 is polyphenylene sulfide (PPS), and the characteristics of the material can make a thickness of the support piece 114 less than 0.4 mm, even only 0.2 mm, and can provide enough supporting strength in such thin thickness. The material of the side frame edge 112 can be polystyrene or Acrylonitrile-Butadene-Styrene (ABS). The support piece 114 has an opening 116.

Figure 2:
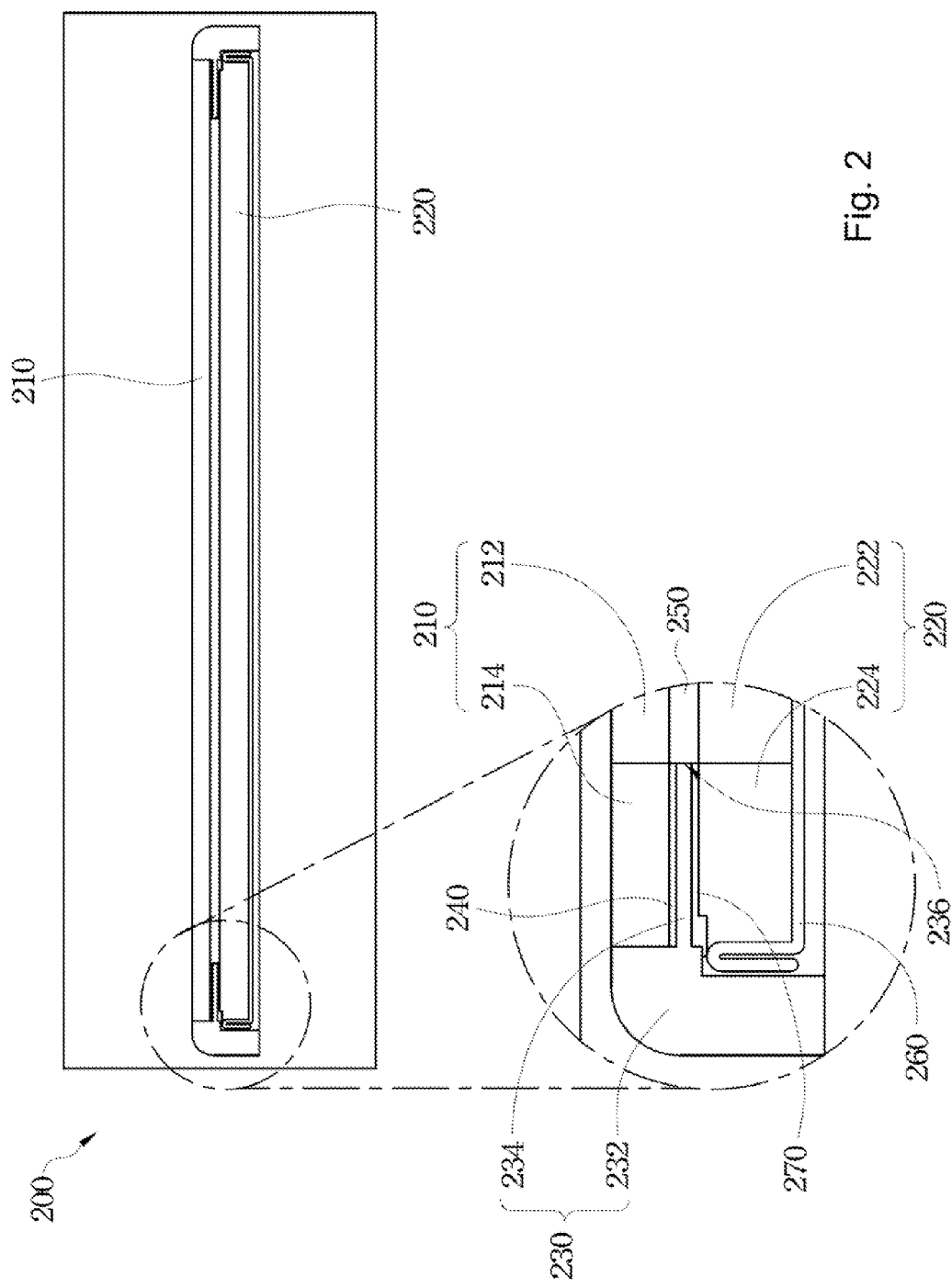
FIG. 2 is a sectional diagram of an embodiment of the touch display assembly structure according to the present invention.

Referring to FIG. 2, it is a sectional view of an embodiment of the touch display assembly structure according to the present invention. The touch display assembly structure 200 includes a touch panel 210, a display panel 220, a plastic side frame 230 and an adhesive layer 240. The touch panel 210 includes a touch area 212 and a wiring area 214. The wiring area 214 is disposed around the touch area 212. The display panel 220 includes a display area 222 and a non-display area 224. The non-display area 224 is disposed around the display area 222.

The plastic side frame 230 includes a side frame edge 232 and a support piece 234 disposed inside the side frame edge 232. The side frame edge 232 and the support piece 234 are formed and joined together by a coinjection molding process. The material of the support piece 234 is polyphenylene sulfide (PPS), and the characteristics of the material can make a thickness of the support piece 234 less than 0.4 mm, even only 0.2 mm, and can provide enough supporting strength in such thin thickness. The material of the side frame edge 232 can be polystyrene or Acrylonitrile-Butadene-Styrene (ABS), and the side frame edge 232 is used as an apparent surface. The support piece 234 has an opening 236. The touch panel 210 and the display panel 220 are respectively disposed at two opposite sides of the support piece 234.

The support piece 234 is disposed between the touch panel 210 and the display panel 220, and the opening 236 of the support piece 234 is used to expose the display area 222 of the display panel 220. The adhesive layer 240 is used to bond the touch panel 210 and the support piece 234. More specifically, the adhesive layer 240 bonds the wiring area 214 of the touch panel 210 and the support piece 234. The width of the support piece 234 is similar to the width of the wiring area 214 of the touch panel 210.

Since the thickness of the support piece 234 can be controlled to be about 0.2 mm, an interval between the touch panel 210 and the display panel 220 is still maintained to be 0.4-0.6 mm even if a thickness of the adhesive layer 240 is added. Through this bonding manner, a complete bonding between the touch panel 210 and the display panel 220 surface by surface can be avoided, thereby effectively reducing the possibility that the touch panel 210 or the display panel 220 is damaged due to rework.

The touch panel 210 can be a capacitor type touch panel. There is an air layer 250 between the touch panel 210 and the display panel 220. The air layer 250 is disposed between the touch area 212 of the touch panel 210 and the display area 222 of the display panel 220 in order to meet the requirement that it is preferred to be empty between the touch panel 210 and the display panel 220.

The touch display assembly structure 200 can further include a middle frame 260. The middle frame 260 is combined with the plastic side frame 230, and the display panel 220 is fixed on the middle frame 260. The middle frame 260 can be a metal plate to support the display panel 220 and is regarded as a ground plate. The display panel 220 can be fixed on the middle frame 260 through a backing adhesive or a screw locking manner. The touch display assembly structure 200 can further include a buffering material 270. The buffering material 270 is disposed between the support piece 234 and the non-display area 224 of the display panel 220, thereby avoiding a damage to the display panel 220 due to direct contact with the support piece 234.

It can be known from the above preferred embodiments of the present invention that applying the present invention has following advantages. The plastic side frame is manufactured through a coinjection molding process, so that the thickness of the support piece can be controlled to be about 0.2 mm. The touch panel can be bonded on the support piece but does not need to be completely bonded with the display panel surface by surface, thereby reducing damages to the touch panel and the display panel during rework.

Although the present invention has been disclosed with reference to the above embodiments, these embodiments are not intended to limit the present invention. It will be apparent to those skilled in the art that various modifications and variations can be made without departing from the scope or spirit of the present invention. Therefore, the scope of the present invention shall be defined by the appended claims.

What is claimed is:

1. A touch display assembly structure, comprising:
   a capacitor type touch panel;
   a display panel comprising a display area;
   a plastic side frame comprising a side frame edge and a support piece disposed inside the side frame edge, wherein the support piece is disposed between the capacitor type touch panel and the display panel, and the support piece has an opening to expose the display area;
   an adhesive layer for bonding the capacitor type touch panel and the support piece; and
   an air layer disposed between the capacitor type touch panel and the display area, wherein a material of the support piece comprises polyphenylene sulfide, and a thickness of the support piece is less than 0.4 mm.

2. The touch display assembly structure of claim 1, further comprising a middle frame combined with the plastic side frame, wherein the display panel is fixed on the middle frame.

3. The touch display assembly structure of claim 2, further comprising a buffering material disposed between the support piece and the display panel.

4. The touch display assembly structure of claim 3, wherein the thickness of the support piece is 0.2 mm.

5. The touch display assembly structure of claim 4, wherein a material of the side frame edge is polystyrene or Acrylonitrile-Butadene-Styrene (ABS).

6. The touch display assembly structure of claim 1, wherein a material of the side frame edge is polystyrene or Acrylonitrile-Butadene-Styrene (ABS).

7. The touch display assembly structure of claim 6, further comprising a middle frame combined with the plastic side frame, wherein the display panel is fixed on the middle frame.

8. The touch display assembly structure of claim 7, further comprising a buffering material disposed between the support piece and the display panel.

9. The touch display assembly structure of claim 1, wherein a thickness of the support piece is 0.2 mm.

10. The touch display assembly structure of claim 9, wherein a material of the side frame edge is polystyrene or Acrylonitrile-Butadene-Styrene (ABS).

* * * * *